(12) United States Patent
Jacobs

(10) Patent No.: US 7,371,040 B2
(45) Date of Patent: May 13, 2008

(54) BALE WAGON HAVING IMPROVED ROLLING RACK TINES

(75) Inventor: Stephen W. Jacobs, Lititz, PA (US)

(73) Assignee: CNH America LLC, New Holland, PA (US)

( * ) Notice: Subject to any disclaimer, the term of this patent is extended or adjusted under 35 U.S.C. 154(b) by 347 days.

(21) Appl. No.: 10/817,255

(22) Filed: Apr. 2, 2004

(65) Prior Publication Data

US 2005/0220592 A1   Oct. 6, 2005

(51) Int. Cl.
  *B65G 57/28* (2006.01)
(52) U.S. Cl. .................. 414/789.7; 414/501; 414/802; 414/111
(58) Field of Classification Search ................ 414/111, 414/132, 501, 789.7, 788.9, 790.1, 790.2, 414/646, 665, 669; 56/476, 478, 480
  See application file for complete search history.

(56) References Cited

U.S. PATENT DOCUMENTS

| | | | |
|---|---|---|---|
| 418,091 A | 12/1889 | Thompson | |
| 2,848,127 A | 8/1958 | Grey | 214/510 |
| 3,065,866 A | 11/1962 | Meyer, Jr. et al. | 214/9 |
| 3,430,783 A | 3/1969 | Butler | 214/6 |
| 3,436,903 A | 4/1969 | Blair | 56/473.5 |
| 3,572,521 A * | 3/1971 | Grey et al. | 414/789.3 |
| 3,620,384 A | 11/1971 | Welker | 214/6 B |
| 3,662,900 A * | 5/1972 | Grey et al. | 414/789.3 |
| 3,952,881 A * | 4/1976 | Knudson | 414/791.5 |
| 3,974,926 A | 8/1976 | Kopaska | 214/352 |
| 4,095,701 A | 6/1978 | Guenon | 214/6 B |
| 4,119,218 A | 10/1978 | Guenon et al. | 214/6 B |
| 4,278,379 A * | 7/1981 | Grey | 414/789.7 |
| 4,282,969 A * | 8/1981 | Zipser | 198/747 |
| 4,289,436 A * | 9/1981 | Zipser et al. | 414/793.4 |
| 4,295,772 A * | 10/1981 | Zimmerman | 414/789.2 |
| 4,305,690 A * | 12/1981 | Butler et al. | 414/789.7 |
| 4,325,666 A * | 4/1982 | Chain et al. | 414/24.5 |
| 4,329,101 A * | 5/1982 | Green et al. | 414/24.5 |
| 4,358,235 A * | 11/1982 | Butler et al. | 414/24.5 |
| 4,838,753 A * | 6/1989 | Gehman et al. | 414/563 |
| 4,971,504 A * | 11/1990 | Klompien | 414/111 |
| 5,168,817 A * | 12/1992 | Nulle et al. | 108/57.29 |
| 5,211,345 A * | 5/1993 | Siebenga | 241/101.76 |
| 5,333,693 A * | 8/1994 | Severeid | 171/82 |
| 5,333,981 A * | 8/1994 | Pronovost et al. | 414/24.5 |
| 5,501,562 A | 3/1996 | Zimmerman | 414/111 |
| 5,547,334 A * | 8/1996 | Baril | 414/802 |
| 6,171,047 B1 * | 1/2001 | Vandervalk | 414/24.5 |
| 6,247,885 B1 | 6/2001 | Smart | 414/111 |
| 6,328,520 B1 * | 12/2001 | Maclay | 414/111 |
| 6,764,274 B2 * | 7/2004 | Maclay | 414/812 |

* cited by examiner

*Primary Examiner*—Saul Rodriguez
*Assistant Examiner*—Charles Greenhut
(74) *Attorney, Agent, or Firm*—Patrick M. Sheldrake; John William Stader; Michael G. Harms

(57) ABSTRACT

A bale wagon is disclosed having rolling rack tines that pivot, by only a few degrees, so as to reduce the angle between said rolling rack tines and the bale wagons loading bed surface at several preset positions, allows improved control over the lean angle of the unloaded bales.

6 Claims, 4 Drawing Sheets

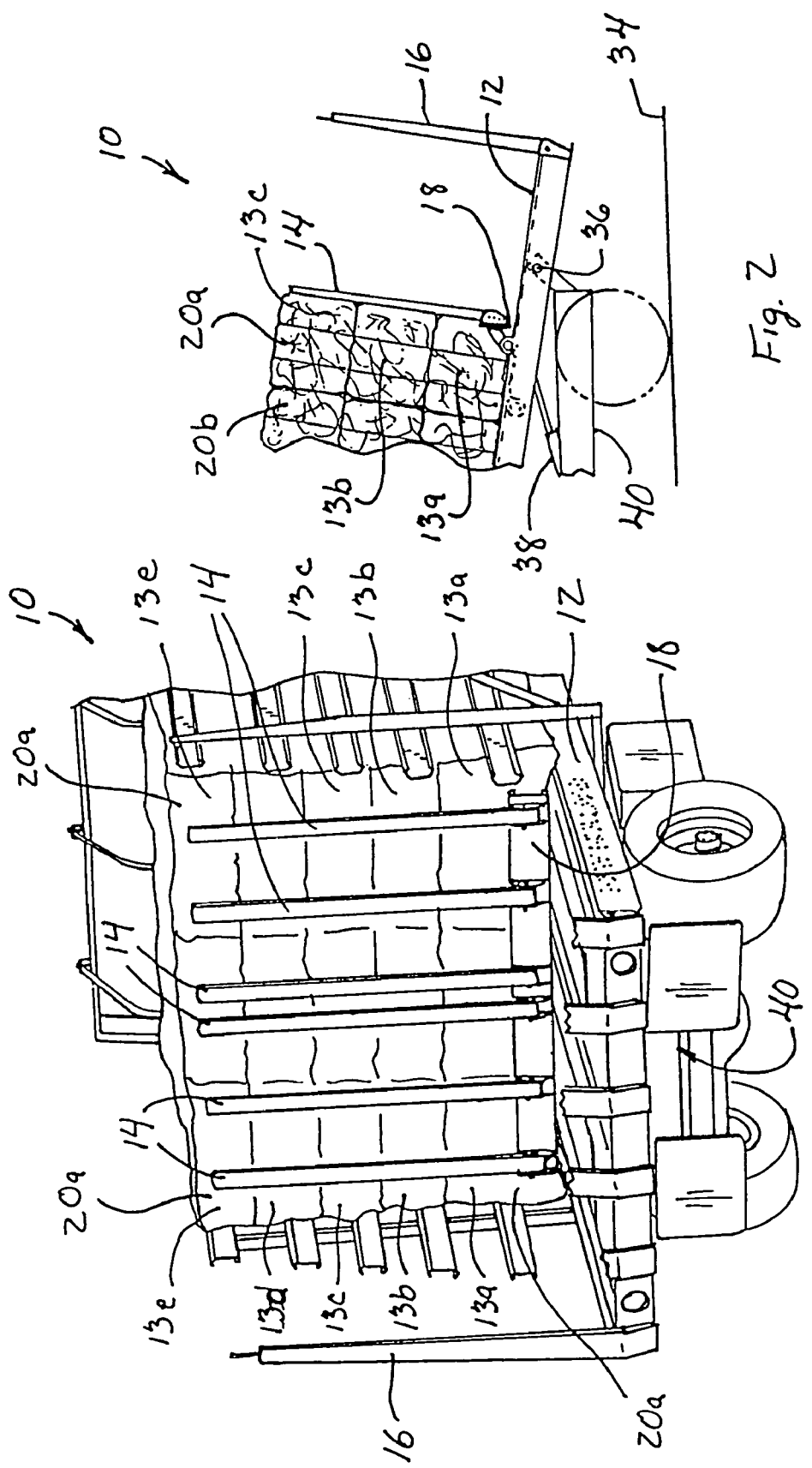

BALE WAGON HAVING IMPROVED ROLLING RACK TINES

CROSS-REFERENCE TO RELATED FILING

Related application U.S. patent application Ser. No. 10/853,626, now U.S. Pat. No. 7,073,835, was filed on May 24, 2004, describing an improved bale wagon.

TECHNICAL FIELD

The present invention relates to bale wagons, and more particularly to the improved design of rolling rack tines for the wagons.

BACKGROUND OF THE PRIOR ART

In the past, considerable effort has been devoted to the development of bale wagons. Note for example, U.S. Pat. Nos. 418,091; 2,848,127; 3,065,866; 3,430,783; 3,436,903; 3,620,384; 3,662,900; 3,974,926; 4,095,701; 4,119,218; 5,501,562; 5,547,334; and 6,247,885. However, little attention has been devoted to improving the characteristics of the unloaded stacks of bales themselves. Consequently, the stackability of baled crops, depends less upon the nature of the baling machinery than upon the inherent nature of the baled crop, i.e. its weight, shape, density, moisture content, etc. For example, tightly gathered, highly dense bales will stack more uniformly than loosely gathered softer bales. Also, even the tightly gathered bales have irregularities which cause inconsistent spacing between individual bales, and in turn leads to individual bales toppling from the stack. Variations in baler settings, feeding speeds, and other factors involving baler mechanisms also limit the height at which the bales can be stacked without falling over. Even the topography of the ground on which the bales are stacked can be detrimental to stackability.

Presently, more uniform, higher stacks and less spillage from toppling is desired. An advancement that would save money and time by enhancing the tidiness of the stacked bales, regardless of the type of crop or topography, but without modifying baler settings, would be welcomed and would satisfy a longfelt need in the industry.

SUMMARY OF THE INVENTION

It is therefore a principal aspect of the present invention to provide an improved bale wagon which allows unloading higher stacks of bales with less spillage from toppling.

It is a further aspect of the present invention to provide a new and improved method for stacking bales of crop, when unloading bale wagons.

Generally, bale wagons consist of a first table to pick-up bales, and a second table for transferring the bales onto yet another table, called a load-carrying bed, which is also known as the "load rack", or "load bed", or "load table." Tiers of bales, typically 3 bales wide, can be formed on the transfer table (which is forward of the load-carrying bed) and then the tiers can be successively loaded, as high as 7 to 9 bales high, onto the load-carrying bed. As each tier is loaded, the previously loaded tiers move rearwardly one bale width to provide space for the new tier. A "movable" (as by rolling or sliding action) rack of tines, on the load-carrying bed, having a plurality of vertically extending tines or fingers which are fixed at their lower ends to a crossbar, extends transversely across the load-carrying bed and supports the rear end of the load. As the load accumulates and moves rearwardly, the movement is biased against the force of a spring or hydraulic cylinder, or other mechanism. The tines move toward an inoperable position, at the rear end of the wagon, such as against a cam associated with the transfer table. When unloading, the load-carrying bed is tilted backwards 90° the wagon pulls away, and the load of bales slides onto the ground. At the point of resting in the 90° tilt, and as the wagon pulls away, the entire weight of the tiers of bales falls onto the rolling rack tines (and onto additional reinforcements at the wagons rear-end, such as special "nonmovable" tines). After the bales are unloaded from the load-carrying bed, the tine rack retracts to its forward most position.

Previously, it was thought that the junction point, at which the rollable crossbar of the rolling rack intersects the bottom ends of the tine fingers, should be integrally fixed or casted together as by welding or otherwise. Thus, structural support is assured, against the entire weight and force of the bales, both when moving rearwardly and when tilting toward the 90° unloading position. It is of note that the angle, defined at that junction point between the tine fingers and the crossbar, will directly correlate to the angle at which the stacks of bales are unloaded, and the angle at which the stacks are unloaded will dictate the angle of lean, of the unloaded stacks.

We have surprisingly discovered that a bale wagon, having rolling rack tines that pivot along the crossbar rather than being integrally fixed or casted to the crossbar, can be secure enough and strong enough to accommodate the maximum weight and force of the load, thereby allowing one to selectably stabilize various angles at which unloaded stacks of bales can lean.

In the present invention, the individual tines are pivotally connected to the crossbar so as to allow a stable point at an approximately 90° tine angle relative to the top surface of the load-carrying bed, and may be adjusted to rest at any of several positions, which positions reduce the tine angle by increments of about 1.5° to about 2°. This provides an effective variation of the lean angle to substantially improve the stacking of unloaded bales, without loss of structural support in the rolling rack as the load accumulates and the load-carrying bed tilts backward.

BRIEF DESCRIPTIONS OF THE DRAWINGS

FIG. 1 is a perspective view of the rear of the bale wagon of the present invention.

FIG. 2 is a partial left side elevational view at the rear of the bale wagon load-carrying bed of the present invention.

DETAILED DESCRIPTION OF THE PREFERRED EMBODIMENTS

Figure 3:
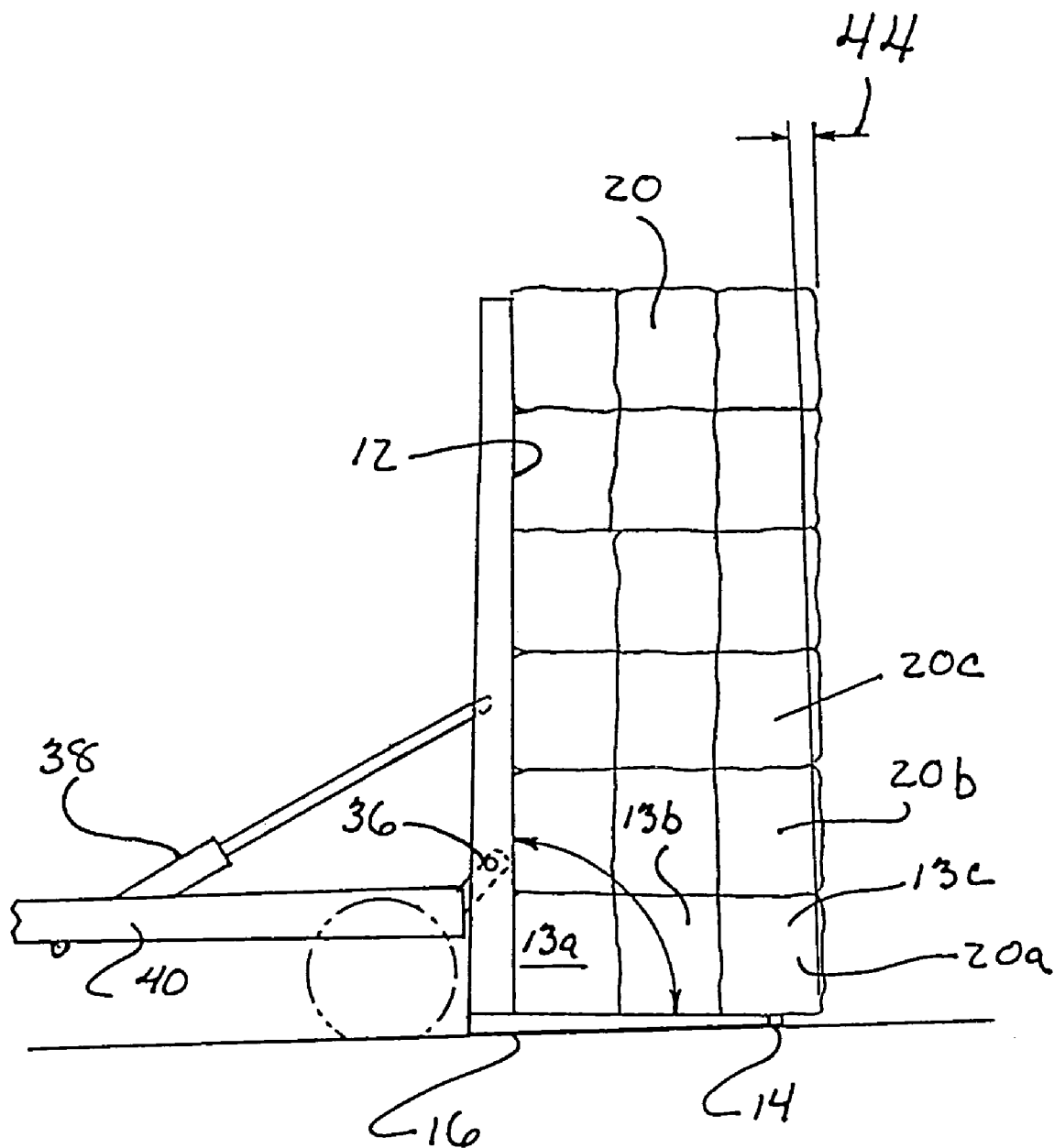
FIG. 3 is a left side elevational view of the load-carrying bed of a fully loaded bale wagon tilted back at 90° for unloading.

The bale wagons of the present invention are equipped with pivotally adjustable tines. The adjustability may be achieved by either electronic circuitry, hydraulic mechanism, or mechanically or other equivalent systems, but preferably for cost effectiveness and simplicity, the pivotal adjustment of the tines is effected by using brackets, braces, pins, hinges and/or other pivotally adjustable elements. The present invention shall be described in terms of one such preferred embodiment.

Referring to the accompanying drawings, particularly FIG. 1, the new and improved bale wagons partial rear end is generally designated 10. The bale wagon 10 has a load-carrying bed (load bed) 12 as its floor which rest on chassis 40. Disposed transversely across the surface of the load bed 12 is a crossbar 18, and vertically extending therefrom are tine fingers 14. The crossbar 18 and tines 14 are collectively referred to as a rolling rack. Stacked on the load bed 12, of the bale wagon 10 is a back tier 20(a) of bales of hay composed of layers which may be identified from bottom to top as 13(a), 13(b), 13(c), 13(d), and 13(e). Nonmovable tines 16 extend vertically from the rear end of the load bed 12, and serve as a rear-end abutment for additional reinforcement against accumulating bales.

A partial view of the back tier of bales 20(a) is shown in FIG. 2, where only layers 13(a), 13(b), and 13(c) are shown. Just forward of tier 20(a), but adjacent thereto, is a partial view of tier 20(b). Bale wagon 10 may accommodate as many as 9 or 10 tiers from front to back. It is most common to stack bales more than 3 rows tall on a bale wagon, as for example in FIG. 1 where the bales are stacked 5 rows high, but they can also be stacked higher as for example, 7 or 9 bales high, and even higher if desired. However, for purposes of illustration and without intent to limit the invention, FIGS. 2 through 9 merely show partial stacks, three rows high, i.e., 13(a), 13(b), and 13(c), and only a limited number of tiers.

Referring again specifically to FIG. 2, the load bed 12 is shown pivotally mounted to chassis 40, at pivot 36 and hydraulic cylinder 38, which enables the load bed 12 to tilt backwards when actuated by hydraulic cylinder 38.

Figure 7:
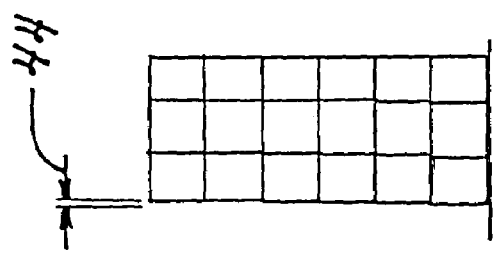
FIG. 7 is a load of stacked bales after having been unloaded from FIG. 6.
Figure 8:
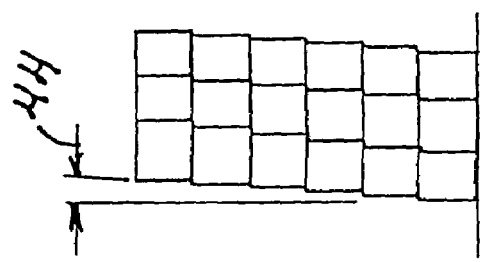
FIG. 8 is a side view of an unloaded stack of bales from a bale wagon having its tines set at position A.
Figure 6:
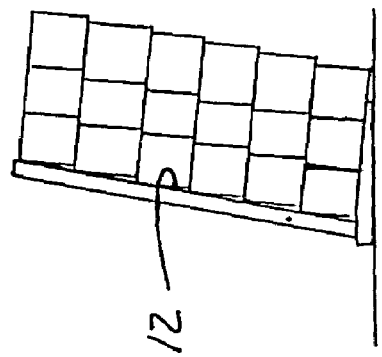
FIG. 6 is a left side view of a fully extended load-carrying bed prepared for unloading.

FIG. 3 illustrates the load bed 12, fully titled to 90°, after having pivoted along pivot 36 from the action of hydraulic cylinder 38 being fully extended from chassis 40. The load bed 12 finds itself completely vertical, i.e. 90°, tilted and resting on fixed, nonmovable tines 16, and the ground or support surface 34. As seen in FIGS. 1, 2 and 3, fixed, nonmovable tines 16 extend upwardly from the rear end of load bed 12, and together with movable tines 14 serve to support the full weight of the load of bales when load bed 12 is in the vertical unloading position. However, adjustable tines 14 will dictate the angle at which the bales are unloaded from the bale wagon, and also the angle of lean 44, of the bales of hay, as the bale wagon 10 pulls away from the load. Note particularly, FIG. 6 shows a stack of bales in load bed 12 when fully tilted, prior to unloading. FIGS. 7 and 8 show unloaded stacks at two different angles.

Figure 5:
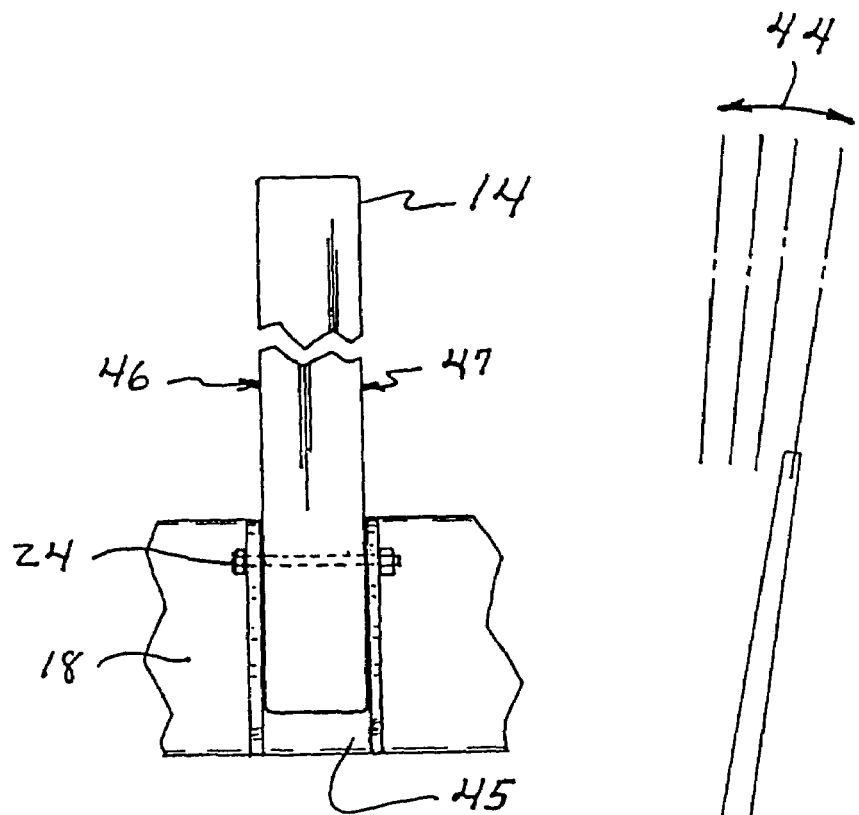
FIG. 5 is a rear elevational view of the junction point where the bottom portion of a rolling rack tine engages the crossbar of the rolling rack.
Figure 4:
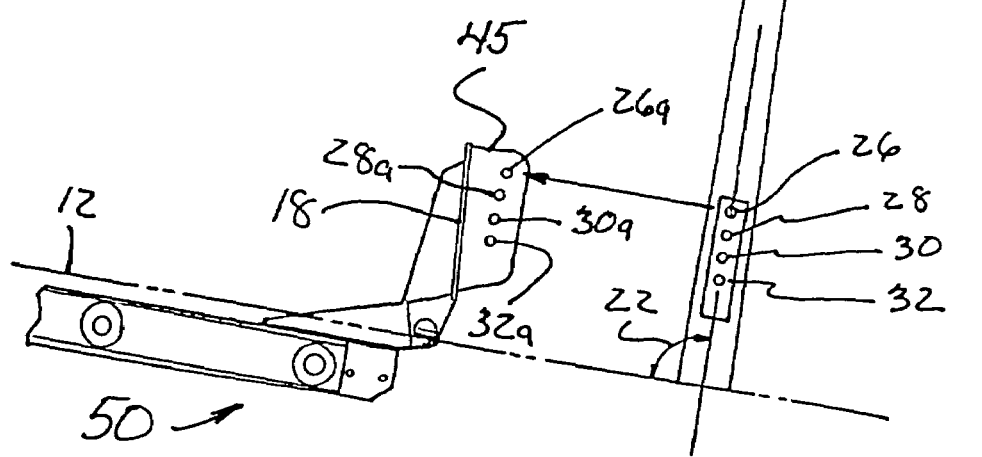
FIG. 4 is a left side elevational view of a rolling rack tine displaced from a bracket on the crossbar of the rolling rack.

FIGS. 4 and 5 show the preferred embodiments for enabling the adjustment of adjustable tine 14. Adjustable tine 14 may be seen to have back surface 40 which faces the stack support surface or ground 34 when the load bed 12 is in the 90°, tilted, unloading position. Adjustable tine 14 also has, opposite to surface 40, a surface 42, which surface 42 contacts the bale tier 20(a). Bracket 45 is fixed on the crossbar 18 to receive adjustable tine 14 in a substantially vertical position, and is fixed to the sliding or rolling element 50, which is movingly engaged within the load bed 12, so as to allow front-to-rear biased movement of load bed 12, as the bales of hay accumulate. A series of openings 26, 28, 30 and 32 (FIG. 4) are aligned in substantial vertical fashion at the base of tine 14 and extend from edge 46 (FIG. 5) through the tine 14 to edge 47 (FIG. 5). These openings are spaced to cooperate with openings 26(a), 28(a), 30(a), and holes 32(a) in bracket 45. A lean angle adjustment bolt 24 is used to secure the adjustable tine 14 along tilt angle 22, which tilt angle correlates to lean angle 44. For example, when lean angle adjustment bolt 24 is secured in holes 26(a) and 26, the first lean angle A of preferably 89.5° may be effectuated. Optionally, bolt 24 may be secured through holes 28 and 28(a), which can provide a second alternative lean angle B, for unloading bales at a different tilt angle 22, of preferably 87.5°. Similarly, holes 30 and 30(a) may receive bolt 24 so as to provide yet another lean angle C, at tilt angle 22, of preferably 86°, while holes 32 and 32(a) can provide a distinct lean angle D, at tilt angle 22, of preferably 84.5°. Note FIG. 6 shows load bed 12 and adjustable tine 14 disposed at lean angle a tilt angle 22 of 84.5° which provides the maximum reduction from vertical of general lean angles 44 for unloading bales. FIG. 7 illustrates stacks at greater lean than FIG. 8 which provides the most upright lean A, of the general lean 44, which inures from the tilt angle 22 of 89.5°.

Figure 9:
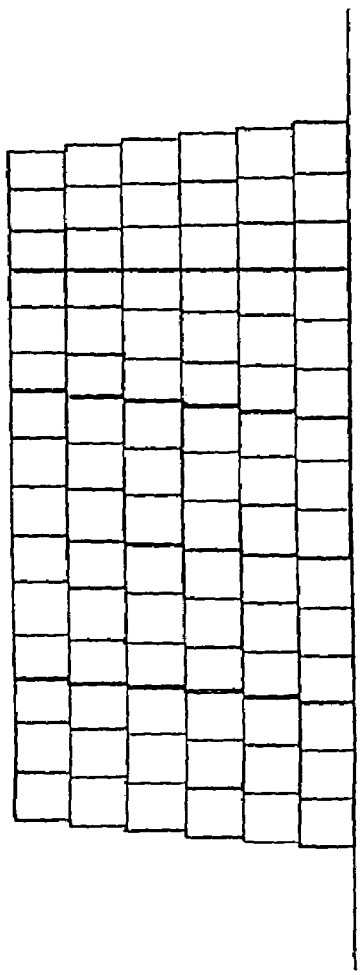
FIG. 9 is a side view of several loads of fully stacked bales having been stored end-to-end to form a windrow.

FIG. 9 shows the advantage of unloading stacks of bales end-to-end forming a windrow when all are leaning to the right except for the last stack at the right which is provided with an opposite lean so as to support the other stacks and to reinforce the stacks against falling over.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a bale wagon having a load bed, a crossbar movable along the load bed, and a plurality of elongate tines, each tine having first and second opposing ends and a longitudinal axis therebetween; said tines attached to the movable crossbar, the improvement comprising:

a plurality of brackets affixed to the crossbar;
   a plurality of adjustment bolts;
   a plurality of spaced apart openings in each of the tines spaced generally along a portion of the length of the longitudinal axis and adjacent to the respective first ends; and
   a plurality of cooperative adjustment apertures in each of said brackets, said adjustment apertures arranged in pairs spaced to cooperate with said openings in each respective tine, each said opening aligning with a coordinated pair of the adjustment apertures in each bracket, whereby a tine is attached to a bracket by inserting one of said bolts in a selected pair of said adjustment apertures and a respective opening, the openings arranged on the tine in a pattern to allow selective adjustment of the tine between a plurality of tilt angles, wherein the tilt angle is measured between the longitudinal axis and the load bed.

2. The improvement of claim 1 wherein the tines are adjustable to one of several positions, said positions reducing the tine tilt angle by increments of about 1.5° to about 2°.

3. The improvement of claim 1 wherein angular adjustment of the tines allows for variation of the angles at which stacks of bales are unloaded.

4. The improvement of claim 1 wherein the at least one bracket is configured to allow multiple possible positions of tilt for each tine, allowing adjustment of the tine tilt angles from between about 90° and about 84°.

5. The improvement of claim 1 wherein the tilt angle is selected from the group consisting of 89.5°, 87.5°, 86°, and 84.5°.

6. A method for unloading tiers of stacked bales from a loaded bale wagon to form a larger stack of bales, said bale wagon having a load bed, a movable crossbar and at least two elongate tines, each tine having first and second opposing ends and a longitudinal axis therebetween, said method comprising: providing a plurality of spaced apart openings in each of the tines spaced generally along a portion of the length of the longitudinal axis and adjacent to the respective first ends; providing a plurality of brackets affixed to the movable crossbar, each bracket having a plurality of cooperative adjustment apertures arranged in pairs spaced to cooperate with said openings in each respective tine, each opening aligning with a coordinated pair of the adjustment apertures in each bracket, whereby a tine is attached to a bracket by inserting one of said bolts in a selected air of adjustment apertures and a respective opening, the openings on the tine arranged in a pattern to allow selective adjustment of the tine between a plurality of tilt angles; setting the tines to a desired first tilt angle, unloading a first load of bales to lean at an angle corresponding to the first tilt angle, repositioning the bolt into a second adjustment aperture and respective opening to set the tines to a second tilt angle and then, against said first load of bales, unloading a second load bales from the same wagon.

* * * * *